Nov. 9, 1948.    A. B. NIETFELD    2,453,638
CIRCULAR SAW RECONDITIONING RIG
Filed June 30, 1947    2 Sheets-Sheet 1

Inventor
Albert B. Nietfeld

By Clarence A. O'Brien
and Harvey B. Jacobson
Attorneys

Nov. 9, 1948.  A. B. NIETFELD  2,453,638
CIRCULAR SAW RECONDITIONING RIG
Filed June 30, 1947  2 Sheets-Sheet 2
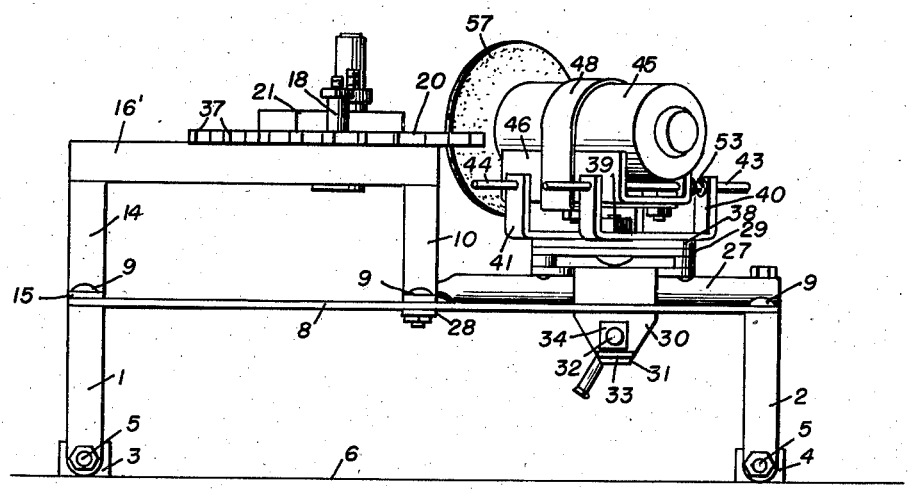
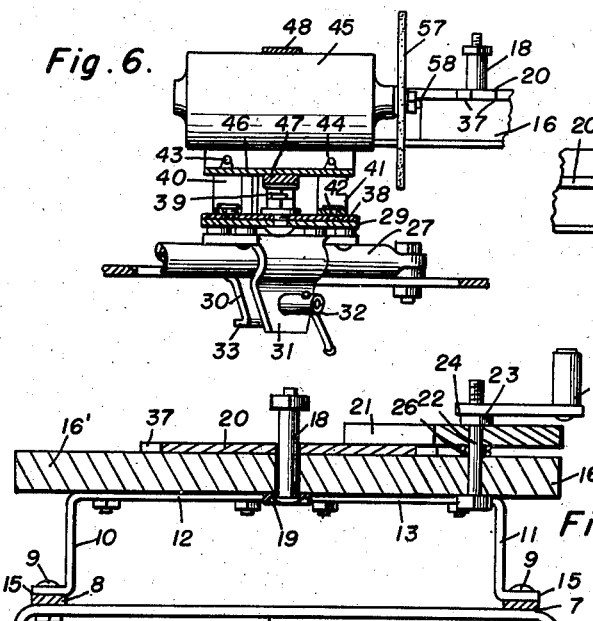
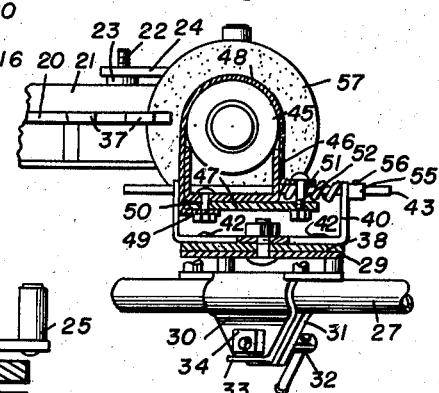
Inventor
Albert B. Nietfeld Patented Nov. 9, 1948

2,453,638

UNITED STATES PATENT OFFICE 2,453,638

CIRCULAR SAW RECONDITIONING RIG

Albert B. Nietfeld, Fort Laramie, Wyo.

Application June 30, 1947, Serial No. 758,155

3 Claims. (Cl. 76—41)

This invention relates to improvements in circular saw reconditioning rigs.

An object of the invention is to provide an improved circular saw reconditioning rig for giving any desired angle of hook to the faces of the saw teeth.

Another object of the invention is to provide an improved circular saw reconditioning rig having adjustment for gumming gullets to uniform depth and for joining the rim of the saw to a true circle.

A further object of the invention is to provide an improved circular saw reconditioning rig which will include means for sharpening the teeth of a rotary or circular saw with any desired angle and slope.

Another object of the invention is to provide an improved circular saw reconditioning rig which will be highly efficient in operation, and relatively inexpensive to manufacture and produce.

Other objects will appear as the description proceeds.

In the accompanying drawings which form a part of this application,

Figure 3 is a side elevation of the improved circular saw reconditioning rig;

Figure 4 is a sectional view taken on the line 4—4 of Figure 1;

Figure 5 is a sectional view taken on the line 5—5 of Figure 1; and

Figure 6 is a sectional view taken on the line 6—6 of Figure 1.

Like characters of reference are used throughout the following specification and the accompanying drawings to designate corresponding parts.

Figure 1:
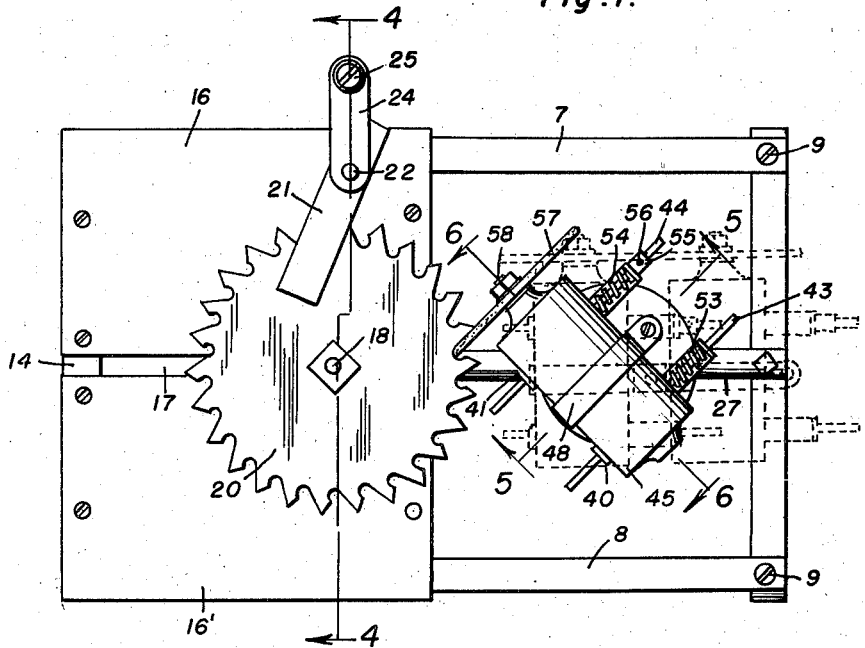
Figure 1 is a plan view of the improved circular saw reconditioning rig.
Figure 2:
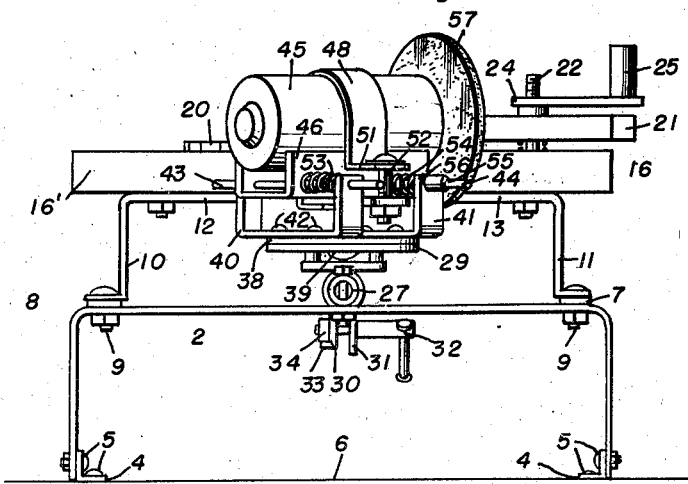
Figure 2 is an end elevation of the improved circular saw reconditioning rig.

In carrying out the invention, there is devised and provided an improved circular saw reconditioning rig including a pair of longitudinally spaced transversely extending inverted U-shape supporting frame members 1 and 2, whose lower ends are secured to the L-shape angle iron bracket members 3 and 4 by means of the bolts 5, said bracket members 3 and 4 being fixed to any desired support or supporting surface 6, as clearly illustrated in Figures 2, 3 and 6 of the drawings.

A pair of transversely spaced, longitudinally extending supporting rails 7 and 8 are secured to and between the opposite ends of the inverted U-shape supporting frame members 1 and 2 by means of the screw bolts 9, while cooperating oppositely disposed L-shape supporting arms 10 and 11 having elongated, inwardly directed extensions 12 and 13, respectively, are also supported on the supporting rails 7 and 8 by means of the screw bolts 9.

An inverted U-shape frame 14 having laterally extending securing end flanges or tabs 15 is secured to the outer bolts 9 serving as a support with said L-shaped supporting arms, and more particularly with the inwardly extending extensions 12 and 13 thereof, for the longitudinally extending work supporting bench members 16 and 16' which are spaced apart to provide the longitudinally extending guide slot 17 for adjustably receiving the upwardly extending arbor shaft or bolt 18. A guide washer 19 will be disposed on the lower end of the arbor or bolt 18 to underlie the adjacent lower edges of the work supporting bench members 16 and 16', for guiding the circular saw 20 when supported upon said arbor or bolt 18 in a horizontal plane and in contact with the upper surfaces of said bench members 16 and 16'.

A saw clamping bar 21 will be rotatably supported upon the upwardly extending bolt 22 extending through the bench member 16, and will be held in the desired fixed adjusted position in contact with the upper surface of the circular saw 20 by means of the washer 23 and cooperating operating lever 24 upon which the handle 25 is supported. A coil spring 26 will be disposed about the bolt 22 between the bench member 16 and the saw clamping bar 21 for resiliently forcing or raising the clamping bar 21 upwardly away from said bench member 16 when the locking bolt 22 is not threaded down to clamp the saw 20 in fixed position.

A tubular motor supporting bar 27 is secured longitudinally and centrally of the rig, being fastened to the inverted U-shape supporting frame member 2, and at its opposite end being fastened to the transversely extending connecting rail 28 disposed between and beneath the supporting rails 7 and 8, by means of the screw bolts 9.

A disk-shape supporting plate 29 is supported by a clamp having oppositely disposed depending arcuate clamping arms 30 and 31 which are bored to receive the transversely extending vise screw or bolt 32. The lower extremity of the arm 30 being formed with a laterally extending flange 33 adapted to engage the nut 34 upon the vise screw or bolt 32 for preventing rotation of the same, said vise screw or bolt 32 permitting the tilting of the disk-shaped supporting plate 29 and the motor 35 and grinding wheel 57 supported thereon to grind the teeth 37 of the circular saw 20 at any desired angle.

A second or upper disk-shape supporting plate 38 of a similar size as the plate 29 will be rotatably supported thereon upon a central pivot bolt 39 which will be loosened for rotary adjustment of said motor upon a horizontal plane, said bolt 39 being adapted to be tightened down for holding said parts in the desired fixed position.

A pair of parallel extending U-shape motor supporting members 40 and 41 will be supported upon the upper surface of the upper disk-shape supporting plate 38 by means of the rivets 42, and the upper ends of the arms of said members 40 and 41 will be formed with aligned apertures for slidably receiving the parallel extending, adjustable motor-supporting rods 43 and 44.

An electric motor 45 will be supported upon the upper edges of a U-shape yoke plate 46 which is, in turn, supported upon a flat plate 47, and cooperates with the motor encircling metal strap 48, one end of which is bent inwardly, as at 49, and is apertured to receive the securing bolt 50 which extends therethrough and thru the plate 47 and base of the yoke mount for the motor 45. The opposite depending end of the motor encircling strap 48 is bent outwardly, as at 51, and is apertured to receive the securing bolt 52 extending therethrough and through the flat plate 47.

Coil tensioning springs 53 and 54 will be disposed about the motor cradle supporting rods 43 and 44 between the adjacent side of the yoke plate 46 and the adjacent inner surfaces of the parallel extending U-shape motor supporting members 40 and 41 for normally urging the motor 45 and its supporting cradle toward the circular saw 20 when supported upon the bench members 16 and 16'. An adjustable tensioning or stop collar 55 will be held by the set screw 56 upon the rod 44 for limiting the outward movement of the motor cradle.

A grinding wheel 57 of any desired type will be secured on the shaft 58 of the electric motor 45 for grinding the saw teeth 37 and for gumming the gullets to uniform depth, and for joining the rim of the saw to a true circle.

From the foregoing description, it will be seen that there has been devised and provided a highly efficient form of circular saw reconditioning rig which will be relatively inexpensive to manufacture and produce.

While the preferred embodiment of the instant invention has been illustrated and described, it will be understood that it is not intended to limit the scope of the invention thereto, as many minor changes in detail of construction may be resorted to without departure from the spirit of the invention.

Having described the invention, what is claimed as new is:

1. A circular saw reconditioning rig including a supporting frame having parallel longitudinally extending supporting rails, a frame supported on one end of said rails, a work support on said last-mentioned frame comprising spaced bench members having a longitudinally extending guide channel formed therebetween, a saw supporting arbor adjustably supported for movement in said guide channel, pivoted clamping means on one end of said bench member for holding said saw in fixed position, a supporting bar mounted longitudinally of said frames, a motor supporting cradle rotatably and tiltably mounted on said supporting bar, a vise clamp for holding said cradle in fixed position, a motor and grinding wheel detachably mounted in said cradle, and resilient feed means for said motor and grinding wheel.

2. A circular saw reconditioning rig including a supporting frame having parallel longitudinally extending supporting rails, an elevated frame supported at one end of said supporting rails, a work support on said last-mentioned frame comprising spaced bench members having a longitudinally extending guide channel formed therebetween, a saw supporting arbor adjustably supported for movement in said guide channel, pivoted clamping means on one of said bench members for holding said saw in fixed position, a supporting bar mounted longitudinally of said frames, a motor supporting cradle rotatably and tiltably mounted on said supporting bar, a vise clamp for holding said cradle in fixed position, motor supporting rods slidably disposed in said cradle, a motor and grinding wheel detachably mounted upon said rods, and resilient feed means on said rod for normally urging said motor and grinding wheel toward the work to be ground.

3. The subject matter as claimed in claim 2, and an adjustable stop collar on one of said rods for limiting the adjustment of said motor and grinding wheel on said supporting rods.

ALBERT B. NIETFELD.

REFERENCES CITED

The following references are of record in the file of this patent:

UNITED STATES PATENTS

| Number | Name | Date |
|---|---|---|
| 63,407 | Markland | Apr. 2, 1867 |
| 106,431 | Tucker | Aug. 16, 1870 |
| 1,385,339 | Stanzel | July 19, 1921 |
| 1,480,172 | Majewicz | Jan. 8, 1924 |